United States Patent [19]
Bernal

[11] Patent Number: 4,806,782
[45] Date of Patent: Feb. 21, 1989

[54] AUXILIARY BRAKE LIGHT CONTROL SYSTEM

[76] Inventor: Patrick J. Bernal, 613 N. Drew St., Mesa, Ariz. 85202

[21] Appl. No.: 132,216

[22] Filed: Dec. 14, 1987

[51] Int. Cl.⁴ ............................................. H02G 3/00
[52] U.S. Cl. ............................. 307/10 R; 307/10 LS; 340/62; 340/69; 340/72
[58] Field of Search ............ 307/10 R, 10 LS, 10 SB; 340/52 R, 52 B, 52 F, 62, 64, 71, 72, 73, 74; 315/77, 78, 79, 82, 83; 180/271, 272, 275, 276, 273, 282; 303/95, 100, 103, 105; 364/424, 426; 280/735

[56] References Cited

U.S. PATENT DOCUMENTS

| | | | |
|---|---|---|---|
| 3,324,454 | 6/1967 | Haratani | 340/62 X |
| 3,364,384 | 1/1968 | Dankert | 315/78 X |
| 3,590,264 | 6/1971 | Mathys | 307/10 R |
| 3,634,792 | 1/1972 | Blomenkamp | 340/52 R |
| 3,997,869 | 12/1976 | Mayer | 307/10 R X |
| 4,107,647 | 8/1978 | Yoshino | 340/69 X |
| 4,357,594 | 11/1982 | Ehrlich et al. | 340/69 X |
| 4,494,199 | 1/1985 | Lehmann | 303/95 X |
| 4,594,574 | 6/1986 | Thurman | 340/71 |

Primary Examiner—William M. Shoop, Jr.
Assistant Examiner—Paul Ip
Attorney, Agent, or Firm—Charles P. Padgett, Jr.

[57] ABSTRACT

The present invention relates to an auxiliary brake light control system which has its primary application in motor vehicles equipped with standard transmissions. In such vehicles, the brake lights are normally illuminated by means of a pressure switch associated with the brake pedal whenever pressure is manually-applied to the brake pedal by the driver. However, as the car slows toward a stop, or after it has actually stopped the driver normally releases his foot from the brake pedal and moves his left foot over to the clutch and his right foot over to the gas pedal thereby turning off the brake light to falsely indicate to those following that the car is not stopped. However, since the car is actually cruising at a very low speed or stopped, severe safety hazards may result. The present invention provides an auxiliary brake light control system which senses the motion of the motor vehicle by means of magnets attached to a rotating shaft whose speed of rotation is proportional to the speed of the motor vehicle to generate a first signal when the speed of the motor vehicle is faster than a predetermined speed and a second signal when it is moving slower than the predetermined speed. A relay coil is normally energized in response to the first signal to keep the brake lights off unless the operator applies pressure to the brake pedal, but for switching the relay coil to a de-energized state whenever the speed falls below a predetermined value for turning on the brake lights even if the operator removes his foot from the brake pedal. The detected signal from the rotating shaft is amplified, smoothed to a DC level, and applied to a comparator whose output controls a transistor switch to maintain the relay coil energized or de-energized, as desired. A DPDT switch is responsive to the state of the relay coil for supplying 12 volt battery potential to the brake lights when the relay coil is de-energized.

20 Claims, 1 Drawing Sheet

AUXILIARY BRAKE LIGHT CONTROL SYSTEM

BACKGROUND OF THE INVENTION

1. Field Of The Invention

The present invention relates generally to an auxiliary brake light control system for motor vehicles having standard transmissions so that the brake lights will be illuminated when the vehicle is stopped even when the driver's foot is released from the brake pedal.

2. Description Of The Prior Art

Motor vehicles provided with automatic transmissions and those provided with manual transmissions are generally equipped so that the brake lights are illuminated when the vehicle is stopped, but only when the driver's foot is depressed upon the brake pedal.

Today's manual and automatic transmission motor vehicles have a single brake light system wherein the brake light is illuminated in response to the manual application of pressure to the brake pedal. However, whenever the manually-applied pressure is removed from the brake pedal, the brake lights turn off giving followers of the motor vehicle the erroneous indication that the motor vehicle is moving, whereas the motor vehicle may be traveling at extremely slow speeds or even stopped.

The brake light control system of the present invention solves substantially all brake light problems inherent in such motor vehicles providing an auxiliary means of illuminating the brake lights even when the driver's foot is removed from the brake pedal.

BRIEF SUMMARY OF THE INVENTION

It is an object of the present invention to provide an auxiliary brake light control system for a motor vehicle.

It is another object of this invention to provide an auxiliary brake light control system for use in combination with a conventional pressure-responsive brake pedal-actuated brake light control system.

It is still another object of the present invention to provide an improved brake light system including both a brake light actuation system responsive to the application of manually-applied pressure applied to the brake pedal and the vehicle is stopped or moving at a very low speed and to an auxiliary system responsive to the motion of the vehicle for actuating the brake lights even when the operator's foot is removed from the brake pedal.

It is yet another object of the present invention to provide an auxiliary brake light control system responsive to the rotation of a shaft whose actual speed of rotation is substantially proportional to the speed of the motor vehicle for turning on the brake lights whenever the speed falls below a predetermined value even if the driver's foot is removed for the brake pedal.

It is a further object of this invention to provide an improved brake light system for a motor vehicle equipped with a manual or an automatic transmission.

It is still a further object of the present invention to provide an improved brake light control system for a motor vehicle including means responsive to the actual speed of the motor vehicle for actuating the brake lights when the motor vehicle is stopped or moving at a very low speed, even though the operator's foot is removed from the brake pedal.

It is yet a further object of the present invention to provide a pair of independently-operated brake light control systems for use in a motor vehicle, one system being responsive to the application of manually-applied pressure to the brake pedal, and the other system being responsive to the speed of the motor vehicle even when the operator's foot is removed from the brake pedal.

The present invention contemplates a brake light control system for use in a motor vehicle having a transmission, a brake system, a brake pedal for manually-operating the brake system, and at least one rotatable shaft whose speed of rotation is substantially proportional to the speed of the motor vehicle. The brake light control system of the present invention includes, in combination, brake lights including a left brake light and a right brake light.

A pressure-detecting switch means responsive to the manual application of pressure to the brake pedal is used for turning on the brake lights and is responsive to the removal of the manually-applied pressure from the brake pedal for normally turning off the brake lights. An auxiliary brake light control system, including a brake light control means, is used for turning on the brake lights in response to the rotation of said at least one shaft even when the manually-applied pressure has been removed from the brake pedal to indicate that the vehicle is stopped or moving very slowly, thereby avoiding giving erroneous brake light information to those following the vehicle.

The present invention includes magnetic means operatively coupled to the shaft for rotation therewith. A sensing inductive coil is used for detecting the rotation of a magnetic means and for generating a first signal in response to the rotational speed being greater than a predetermined value and for generating a second signal in response to the rotational speed being less than said predetermined value. An amplifier is used to amplify at least the first signal and for generating a high output signal in response thereto. The output signal from the amplifier is then integrated to provide a relatively smooth DC value signal equivalent thereto. A comparator compares the DC signal to a reference signal, and includes means for delaying the output of the comparator. The comparator output moves in one direction to cause a switching means to complete a conductive path through a relay coil and in a second direction to turn a transistor switch off to de-energize the relay coil. The relay coil acts upon a DPDT switching means and a combination of switches associated therewith to insure illumination of the brake lights whenever the relay is de-energized to indicate that the speed of the motor vehicle has fallen below the predetermined value.

These and other objects and advantages of the present invention will become more fully understood after reviewing the detailed description of the preferred embodiment, the claims, and the drawings, which are briefly described hereinbelow.

DETAILED DESCRIPTION OF THE PREFERRED EMBODIMENT

Figure 1:
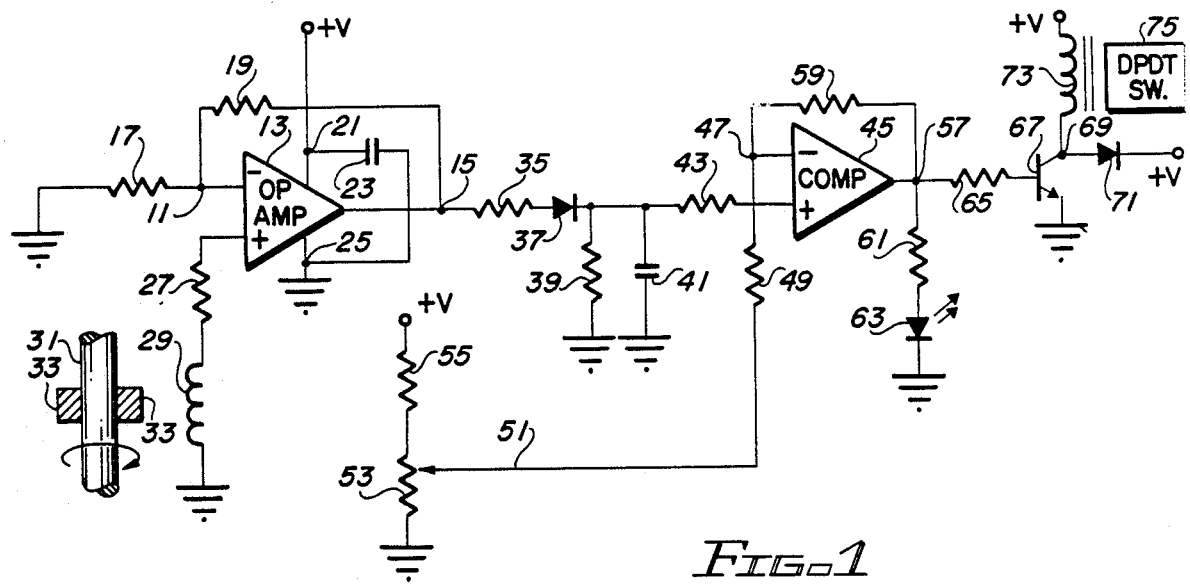
FIG. 1 is an electrical schematic diagram of the auxiliary brake light control system of the present invention.

FIG. 1 shows an electrical schematic diagram of the auxiliary brake light control system of the present invention. In FIG. 1, an inverting input node 11 is shown as being directly connected to the inverting input of an operational amplifier 13 whose output is taken from the operational amplifier output node 15. Input node 11 is connected through a resistor 17 directly to ground. The output node 15 is also connected to the input node 11 through a feedback register 19 for providing negative feedback for amplification purposes. The positive voltage input node 21 is connected directly to the +V input of the operational amplifier 13 and to a source of positive potential +V. Node 21 is connected to one plate of a capacitor 23 whose opposite plate is connected back to a negative or ground input node 25 which is connected directly to ground and to the ground input of the operational amplifier 13.

The non-inverting input of the operational amplifier 13 is connected through a resistor 27 to one terminal of a sensing inductive coil 29 whose opposite terminal is grounded. The coil 29 senses signals produced by the magnets 33 mounted on the rotatable shaft 31 which can be, for example, any rotatable shaft on the motor vehicle which rotates at a speed proportional to the speed of the motor vehicle. As the shaft 31 rotates in proportion to the speed of the motor vehicle, the magnets 33 are sensed by the coil 29 and a first signal is produced when the speed of rotation of the shaft 31 is grater than a predetermined value while a second signal is produced or generated when the speed of rotation of the shaft 31 is less than a predetermined or given value.

The operational amplifier output node 15 is connected through a resistor 35 to the anode of a diode 37 whose cathode is connected through a resistor 43 to the positive input of a comparator 45. A resistor 39 has one terminal connected to ground and its opposite terminal connected to the junction of the cathode of diode 37 and one terminal of the resistor 43, while a capacitor 41 has one plate grounded and its opposite plate connected to the junction of the cathode of the diode 37 and the one end of resistor 43 whose opposite end is connected to the positive input of the comparator 45. A negative input node 47 is connected directly to the negative input of the comparator 45. The output node 57 of the comparator 45 is connected back to the negative input node 47 through a feedback resistor 59, while the negative input node 47 is connected through a resistor 49 and a lead 51 to form a variable tap for a potentiometer 53. The potentiometer 53 has one terminal connected to ground and its opposite terminal connected to a positive source of potential +V through a resistor 55.

The comparator output node 57 is connected through a resistor 65 to the base of a transistor 67 whose emitter is grounded, and its collector is connected to a collector output node 69. The collector output node 69 is connected to the anode of a diode 71 whose cathode is connected to a positive source of potential +V. Node 69 is also connected to one terminal of a relay coil 73 whose opposite terminal is connected to a positive source of potential +V. The relay coil 73 operates the switching system and the DPDT switch of block 75 as hereinafter described with respect to FIGS. 2 and 3.

The comparator output node 57 is also connected through a resistor 61 to the anode of a light-emitting diode (LED) 63 whose cathode is grounded. When the output of the comparator 45 is normally high, indicating that the sensing coil 29 detects that the speed of rotation of the shaft 31 is above the predetermined value, the LED 63, conventionally a greed LED, will conduct light to give a visual indication that the brake lights are not on. However, when the output of the comparator goes low, the transistor 67 turns off thereby breaking the conductive path through the relay coil 73 and deenergizing the coil 73. With the relay coil 73 de-energized, the DPDT switching means and the associated switches change position to illuminate the brake lights even if the driver has removed his foot from the brake pedal.

The operational amplifier 13 is a conventional device such as one of a LM324, and it significantly amplifies the voltage present at its non-inverted input and supplies the amplified signal to the output node 15. An integrator is disposed between the output 15 of the operational amplifier 13 and the positive input node 47 of the comparator 45. The integrator includes resistors 35, 39, and 43 together with capacitor 41. This network smooths the signal present at the operational amplifier output 15 and converts it to a substantially DC level signal equivalent thereto. This DC level signal is supplied to the positive input of the comparator 45, and it is either at a high level or a low level depending upon whether the first or second signal was produced by the sensing coil 29. A voltage divider network comprising resistor 55 and potentiometer 53 together with resistor 49 and capacitor 41 can be used to provide a delay dependent on the RC time constant of the circuit so that the output of the comparator 45, which is normally high, will not drop low immediately upon the sensing of the generation of the second signal, but will remain high for a predetermined period of time or predetermined delay period, as desired.

The comparator 45 is a conventional operational amplifier such as a conventionally available LM324, identical to that of operational amplifier 13, and it has been configured in FIG. 1 as a comparator, as known in the art. The output of the comparator 45 is normally high as long as the sensing coil detects that the shaft is rotating above the predetermined speed. This high signal will cause the LED to illuminate a green color indicating that the brake lights are not on. Simultaneously, the high at the output of the comparator will turn the transistor switch on to insure that current flows through the relay coil and keep it in a normally energized state.

As soon as the speed of the motor vehicle has dropped below the predetermined given speed, the sensor 29 generates the second output signal which appears as a low DC signal at the positive input of the comparator 45 and causes the signal at the comparator output to go low. A low signal at the output of the comparator 45 causes the LED 63 to turn off and the transistor 67 to switch to a nonconducting state, thereby breaking the conductive path between the positive source of potential +V and ground through the relay coil 73 and the transistor switch 67. The relay coil 73 is therefore switched to a de-energized state causing the contacts of the DPDT switching means and the switches of the associated switching network to change state, as hereinafter described, and enable the brake lights to be illuminated even if the operator's foot has been removed from the brake pedal.

Figure 2:
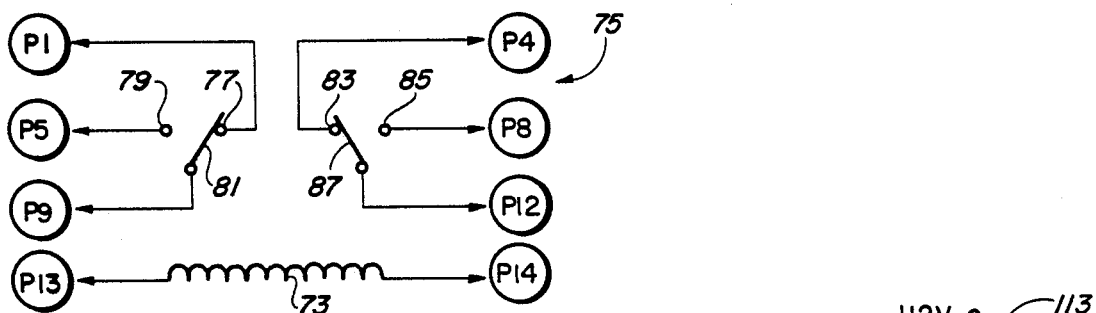
FIG. 2 is a schematic diagram of the DPDT switching means used in the circuit of FIG. 1.

FIG. 2 illustrates a twelve VDC DPDT relay used in the circuit of FIG. 1. This is a conventional device such as a model number 275-206 and is conventionally available. FIG. 2 illustrates the DPDT switch with the contacts in the position associated with the de-energization of the relay coil 73.

In FIG. 2, the relay coil 73 is shown as having one terminal connected to the contact terminal P13 and its opposite terminal connected directly to the contact terminal P14. When the relay coil 73 is de-energized, the remaining contacts are as described hereinbelow. The P1 contact 77 connects to the P9 movable contact 81 to form a conductive path between contact terminals P1 and P9 via the normally closed contact 77 and the moveable contact 81. However, when the relay coil is energized, the moveable contact 81 will move to the left and engage contact 79 so as to complete a continuous path between the contact terminal P5 and the contact terminal P9 via the normally open contact 79 and the moveable contact arm 81.

Similarly, the moveable contact arm 87 will normally connect the contact terminal P12 with the normally closed contact 83 and the normally closed contact 83 connects directly to the contact terminal P4 so as to provide a continuous path between the contact terminal P4 and the contact terminal P12 via contact 83 and the moveable contact arm 87. When the switch is energized, the moveable contact arm 87 engages the normally open contact 85 and completes a continuous path between the contact terminal P8 and the contact terminal P12. The circuit of FIG. 2 illustrates the DPDT switch of block 75 of FIG. 1.

Figure 3:
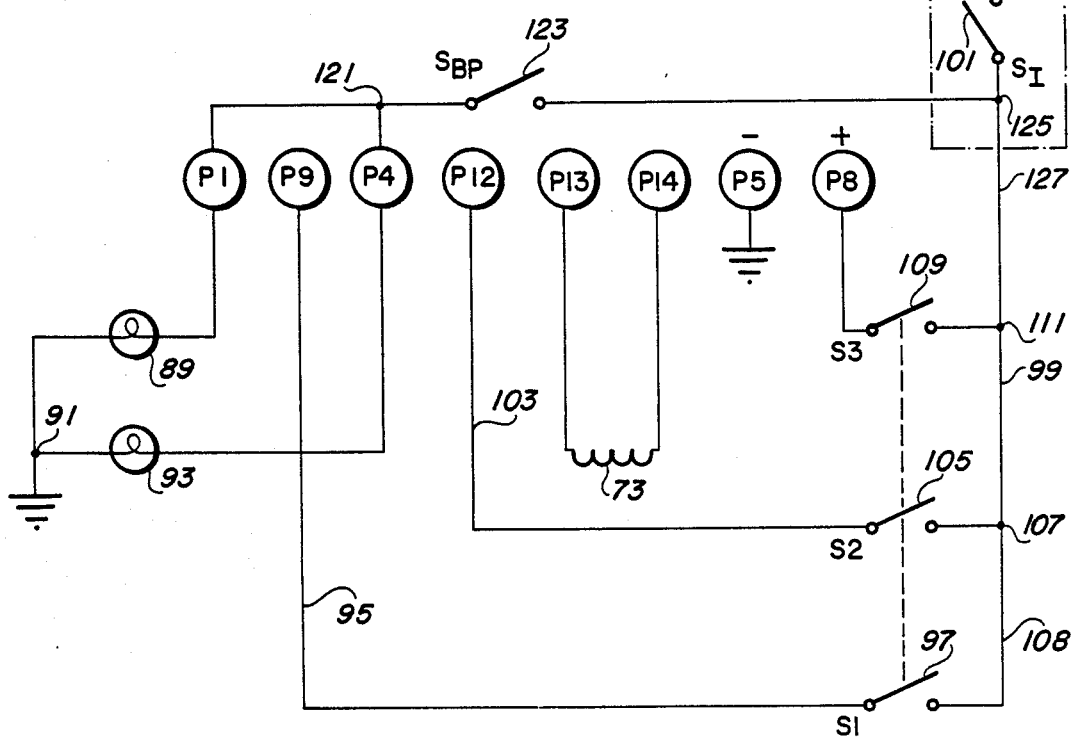
FIG. 3 is a schematic illustration of the switching circuitry used to operate the brake lights of the motor vehicle in response to the energization of the relay coil.

FIG. 3 illustrates the switching means of block 75 of FIG. 1 and their interrelationship to the switch contact terminals of the DPDT switch of FIG. 2. In FIG. 3, the contact terminal P1 is shown as being connected directly in one terminal of a brake light 89 whose opposite terminal is grounded at ground node 91. A second contact terminal P4 is connected directly to one terminal of the opposite brake light 93 whose opposite terminal is grounded at note 91. The contact terminals P1 and P4 are commonly connected together at node 121. Node 121 is connected through a switch 123 to the contact terminal P8 which supplies a positive voltage potential thereto. The switch 123 is designated $S_{BP}$ and illustrates the conventional pressure-sensitive switch associated with the brake pedal of a motor vehicle wherein the pressure sensitive switch $S_{BP}$ closes in response to the manual application of pressure applied thereto indicating that the brake pedal has been depressed and for connecting a positive source of potential +V from contact terminal P8 directly to the brake lights 89 and 93 for illuminating same. This is the primary brake light control system already present in most motor vehicles including those with manual transmissions.

Furthermore, in FIG. 3, contact terminal P9 is connected via led 95 to the moveable arm of a switch 97, designated S1, whose normally opened terminal is connected directly to a common switch output node 111 via lead 108, node 107, and lead 99. The switch 97 or S1 is a normally open, relay-operated switch which remains open as long as the relay coil 73 is energized, but which closes in response to the de-energization of the relay coil 73 to complete a conductive path between the contact terminal P9 and the common node 111 via lead 95, the closed switch 97, lead 108, node 107, and lead 99. Similarly, the contact terminal P12 is connected via led 103 to the switch arm of a second normally open relay-operated switch 105 or S2 whose normally open contact is connected to an output node 107 and via led 99 to the common switch output node 111. Lastly, the contact terminal pin P8 is connected directly to the switch arm of a third normally opened relay-operated switch 109 or S3 whose normally opened contact is connected directly to the common switch output node 111.

Contact terminal P13 is connected to contact terminal P14 through the relay coil 73, while the negative or ground contact terminal P5 is grounded. The common switch output node 111 is connected through a normally open ignition switch 101 or $S_I$ whose opposite switch terminal is connected directly to a +12 volt source of battery potential. The ignition system is represented by block 113 and includes an ignition switch $S_I$. Whenever the ignition key is inserted into the ignition and turned, the ignition switch 101 closes to complete a current path between the +12 volt battery and the common output node 111 through the closed ignition switch 101 node 125 and lead 127.

The +12 volt battery is, therefore, normally present at the common node 111 so long as the ignition switch is turned on. As long as the ignition switch is on, the voltage at node 111 is coupled to the normally open brake pressure switch 123 so that whenever the brake pedal is depressed, the switch 123 closes to supply the voltage to node 121 and hence to the brake lights 89 and 93 via contact terminals P1 and P4, as conventionally known in motor vehicles today.

The operation of the auxiliary brake light control system of the present invention will now be briefly described. Assuming that, under normal conditions, the motor vehicle is moving along at some significant speed so that the speed of rotation of the rotatable shaft 31 and the magnetic means 33 mounted thereon causes the sensing coil 29 to generate the first signal and supply it to the non-inverting input of the operational amplifier 13 via resistor 27. The operational amplifier then amplifies the first signal significantly and produces an amplified equivalent thereof at its output 15. The signal at the output 15 is then integrated or smoothed out to produce a substantially DC signal equivalent thereto which is then fed to the positive input of the comparator 45. A reference which can be varied and which represents the predetermined speed, is supplied to the negative input of the comparator so that when the signal at the positive input is a relatively high DC signal indicative of the first signal generated by the sensing coil, the output of the comparator goes high, but when the signal at the positive input is low, indicating that the second signal is being produced or generated by sensing coil 29 meaning that the speed of the motor vehicle has gone below some predetermined desired speed, the output of the comparator goes low.

When the signal at the comparator output node 57 is high, LED 63 conducts to indicate that the brake lights are not on and the signal is fed via resistors 65 to the base of a switching transistor 67 which normally conducts to form a current path between a positive source of potential and ground through the relay coil 73 causing the relay coil to remain energized.

As long as the relay coil 73 remains energized, contact arm 81 will be closed on contact 79 to couple contact terminal P5 to P9 while moveable contact arm 87 will engage contact 85 to normally connect contact terminal P8 to P12. However, since switches S1 and S2 remain normally open, no energy is transferred.

However, when the signal at the output of the comparator 45 goes low, the LED 63 turns off and transistor 67 is switched to a nonconductive state thereby de-energizing the relay coils 73. When the relay coil 73 is de-energized, the contacts are as shown in FIG. 2 on the DPDT switch. The switches S1, S2 and S3 immediately close in response to the de-energization of the relay coil thereby completing a current path between the common node 111 and its associated +12 volt battery potential. When the switches S1, S2 and S3 close, switch S1 connects the battery potential by a lead 95 to contact terminal P9 whereas closed switch S2 connects to battery potential via led 103 to the contact terminal P12. Since P12 is connected to P4 and P9 is connected to P1 in the DPDT switch of FIG. 2, the power is fed from the contact terminals P1 and P4 through the brake lights 89 and 93, respectively, to the grounded node 91 thereby completing a current path therethrough and illuminating the brake lights even if the manually applied pressure has been removed from the brake pedal and the switch $S_{BP}$ is opened. This insures that the persons riding behind the motor vehicle equipped with the system of the present invention do not receive a false brake light signal indicating that the vehicle is moving even when it is actually stopped.

The auxiliary brake light control system of the present invention insures that even if the driver's foot is removed from the brake pedal, as conventionally done in motor vehicles provided with manual transmissions wherein the driver removes his right foot from the brake and places his right foot on the gas pedal while his left foot goes to the clutch, the sensing coil 29 will detect that the rotational speed of the shaft indicative of the speed of the motor vehicle has dropped below a predetermined speed so as to cause the relay coil 73 to be de-energized, the switches S1, S2 and S3 to close, the DPDT switch to conduct the battery potential through the closed switches to illuminate the brake lights to indicate that the motor vehicle is stopped.

It will be understood by those skilled in the art that various modifications, changes, variations, substitutions, and alterations, can be made in the structure, components and circuitry of the present invention without departing from the spirit and scope thereof which is limited only by the appended claims.

What is claimed is:

1. An improved brake light control system for use in a motor vehicle equipped with either a standard or an automatic transmission, at least one shaft which rotates at a speed proportional to the speed of the motor vehicle, a brake system, a brake pedal responsive to the manual application of pressure thereto for operating said brake system, a pair of brake lights including a left and a right brake light, a pressure-sensitive switching means responsive to said manual application of pressure to said brake pedal for activating said brake lights and to the termination of said manual application of pressure on said brake pedal for deactivating said brake lights, the improvement comprising an auxiliary brake light control system comprising:

sensing means responsive to the rotation of said at least one shaft for generating a first signal in response to the rotation of said shaft at a speed above a predetermined speed and for generating a second signal in response to the rotation of said at least one shaft at a speed below said predetermined speed; and brake light control means responsive to said first signal for maintaining said brake lights off unless pressure has been a manual application of pressure to said brake pedal and responsive to said second signal for turning said brake lights on even if said manual application of pressure has ceased to be applied to said brake pedal.

2. The improved auxiliary brake light control system of claim 1 wherein said sensing means includes:

magnetic means mounted on said at least one shaft for rotation therewith; and an inductive means operatively mounted in proximity to said at least one rotating shaft for sensing the rotation of said magnetic means and outputting said first signal whenever the speed of rotation of said at least one shaft is above said predetermined speed and for outputting said second signal whenever the speed of rotation of said at least one shaft is below said predetermined speed.

3. The improved auxiliary brake light control system of claim 2 wherein said brake light control means further includes:

amplifier means for outputting an amplified High signal in response to the generation of said first signal and a Low signal in response to the generation of said second signal;

comparator means having one input connected to the output of said amplifier means and being responsive to said amplified High signal for outputting a comparator High signal and responsive to said Low signal for outputting a comparator Low signal;

a relay coil having an input and further having an energized state and a de-energized state;

means connected between the output of said comparator means and the input of said relay coil responsive to the output of said comparator means being said comparator High signal for normally maintaining said relay coil in said energized state and responsive to the output of said comparator being said comparator Low signal for switching said relay coil to its de-energized state;

relay-operated switching means including a double pole-double throw switch responsive to said relay coil being in said energized state for not turning said brake lights on, and being responsive to said relay coil being in said de-energized state for turning said brake lights on even if said manual application of pressure has been removed from said brake pedal as when a driver is stopped at a light or the like and has his left foot on said clutch and his right foot has been removed from said brake pedal and applied to said gasoline feed control pedal.

4. The improved auxiliary brake light control system of claim 3 wherein said amplifier means includes:

an operational amplifier having an inverted input, a non-inverted input, and an amplifier output;

a first resistor connected between ground and the inverted input of said operational amplifier;

a second resistor connected in a negative feedback configuration between said operation amplifier output and said inverting input;

a third resistor connected in series between said non-inverting input of said operational amplifier and said inductive sensing coil for supplying said first and said second signals to said non-inverting input of said operational amplifier.

5. The improved auxiliary brake light control system of claim 4 wherein said comparator means includes an operational amplifier configured as a comparator and having a positive input, a negative input, and a comparator output;

means for generating a reference signal and means for supplying said reference signal from the output of said means for generating a reference signal to the negative input of said comparator; and means for integrating the output of said operational amplifier and supplying said integrated output signal to the positive input of said comparator.

6. The improved auxiliary brake light control system of claim 5 wherein said means for integrating the output of said operational amplifier comprises:

a forth resistor;

a fifth resistor;

a diode having its anode connected to one end of said forth resistor and its cathode connected to one end of said fifth resistor;

the opposite end of said forth resistor being connected to the output of said operational amplifier and the opposite end of said fifth resistor being connected directly to the positive input of said comparator;

a sixth resistor having one end connected to the junction of the cathode of said diode and said one end of said fifth resistor, and its opposite end connected to ground;

a capacitor having one plate connected to the junction of the cathode of said diode and said one end of said fifth resistor, and its opposite plate connected to ground; and said diode, said fourth, fifth and sixth resistors and said capacitor including integrator means for smoothing out the signal at the output of said operational amplifier and producing a substantially DC voltage signal and for supplying same to the positive input of said comparator.

7. The improved auxiliary brake light control system of claim 6 wherein said means for supplying a reference signal to the negative input of said comparator includes:

a feedback resistor coupled between the output of said comparator and the negative input thereof;

an eighth resistor having one end connected to the negative input of said comparator a ninth resistor;

a source of positive voltage;

a potentiometer connected in series with said ninth resistor between said source of positive voltage and ground, said potentiometer having a potentiometer tap being for supplying a manually-selectable voltage level to the negative input of said comparator such that the value of said voltage level and the charge on said capacitor provides a predetermined desired time delay to the signal appearing at the output of the comparator, said eighth resistor having its opposite end connected to said potentiometer tap.

8. The improved auxiliary brake light control system of claim 7 wherein said brake light control means including said means responsive to the output of said comparator means further includes a transistor means having an emitter electrode, a collector electrode, and a base electrode, said transistor means having said emitter electrode connected to ground and said collector electrode providing an output for said transistor means;

a second diode having an anode electrode and a cathode electrode;

a source of positive potential;

said anode electrode of said second diode being connected to said transistor output at said collector thereof and the cathode electrode of said second diode being connected to said source of positive potential;

a relay coil connected in series between said positive source of potential and said transistor means output, said transistor means being normally maintained in a conductive state by the signal at the output of said comparator which is connected to said base electrode of said transistor means for maintaining said relay coil in said energized state, said transistor means being responsive to the output of said comparator going Low for switching to a non-conductive state and de-energizing said relay coil in response thereto.

9. The improved auxiliary brake light control system of claim 7 wherein said means responsive to the output of said comparator means includes transistor means, said transistor means including:

a conventional NPN transistor having an emitter, a collector, and a base, said emitter being connected to ground, said collector being connected to said output of said transistor means;

a tenth resistor having one terminal connected to said base of said transistor and the opposite terminal connected to said comparator output;

a light-emitting diode having an anode and a cathode;

an eleventh resistor having one terminal connected to the output of said comparator and its opposite terminal connected to the anode of said light-emitting diode whose cathode if grounded, said light-emitting diode being responsive to the output of said comparator being High for being illuminated and being responsive to the output of said comparator being Low for turning off; and second diode means having an anode and a cathode, said diode being connected in series between said source of positive potential and said output of said transistor means, said transistor means output being connected to the anode of said second diode and the cathode of said second diode being connected to said source of positive potential.

10. The improved auxiliary brake light control system of claim 9 wherein said Double Pole-Double Throw switching means includes:

a first contact terminal P1;

a second contact terminal P4;

a third contact terminal P5;

a fourth contact terminal P8;

a fifth contact terminal P9;

a sixth contact terminal P12;

a seventh contact terminal P13;

an eighth contact terminal P14;

said relay coil being connected in series between said seventh contact terminal P13 and said eighth contact terminal P14;

said fifth contact terminal P9 and said sixth contact terminal P12 corresponding to a movable relay-operated contact responsive to the state of said relay coil for determining the position thereof, said first contact terminal P1 being normally closed upon and connected to said third contact terminal P5 whenever said relay coil is de-energized, and said first contact terminal P1 being connected to said fifth contact terminal P9 whenever said relay coil is de-energized, said 4th contact terminal P8 being normally closed upon said sixth contact terminal P12 whenever said relay coil is energized, and said 2nd contact terminal P4 being closed upon said sixth contact terminal P12 when said relay coil is de-energized;

first, second, and third normally-opened relay-operated switches;

means for connecting a first one of said brake lights between said first contact terminal P1 and ground;

means for connecting the opposite one of said pair of brake lights between said second contact terminal P4 and ground;

means for connecting said first switch between said fifth contact terminal P9 and the open contacts of said second and third switches;

said second switch being normally connected between said sixth contact terminal P12 and the common open contact terminals of said first and third switches;

said third switch being connected between said fourth contact terminal P8 and the common open terminals of said first and second switches;

a 12 Volt source of battery potential;

ignition switch means connected between the common open contacts of said first, second and third switches and said 12 volt source of battery potential whenever said ignition is on and said car is running;

said pressure-actuated brake pedal switch being responsive to said manual of application of pressure to said brake pedal and being connected between said fourth contact terminal P8 representing said 12 volt source of battery potential and both of said first and second contact terminals P1 and P4, respectively, for normally supplying electrical energy to said brake lights whenever said manual application of pressure is applied to the said brake pedal thereby closing said brake pedal switch; and said relay-operated first, second, and third switches being normally opened in response to said relay coil being energized and being responsive to said relay coil switching to a de-energized state for closing to complete a conductive path between said fifth and sixth contact terminals P9 and P12, respectively, and said +12 volt source of battery potential connected between said third and fourth contact terminals P5 and P8, respectively, for lighting the brake lights to indicate that the car has stopped moving or is moving below some predetermined speed even though the driver's foot has been removed from said brake pedal.

11. A brake light control system for use in a motor vehicle having a brake system, a brake pedal responsive to the manual application of pressure thereto for operating said brake system, and at least one rotatable shaft whose speed of rotation is substantially proportional to the speed of said motor vehicle, said brake light control system comprising, in combination:

brake lights including a left brake light and a right brake light;

a pressure-detecting switch means connected to said brake pedal and responsive to said manual application of pressure to said brake pedal for turning on said brake lights, said pressure-detecting switch means being further responsive to the termination of said manual application of pressure from said brake pedal for normally turning off said brake lights; and an auxiliary brake light control system including brake light control means for turning on said brake lights in response to the speed of rotation of said at least one shaft being less than a predetermined speed even when said manual application of pressure has been removed from said brake pedal to indicate that said motor vehicle is substantially stopped even though the driver's foot has been removed from said brake pedal.

12. The combination of claim 11 wherein said auxiliary brake light control system and said brake light control means include:

magnetic means mounted on said at least on shaft for rotation therewith; and an inductive coil sensing means mounted in proximity to said at least one rotating shaft for detecting the rotation of said magnetic means with said shaft and outputting said first signal whenever the speed of rotation of said at least one shaft is above said predetermined speed and for outputting said second signal whenever the speed of rotation of said at least one shaft is below said predetermined speed.

13. The combination of claim 12 wherein said brake light control means further includes:

amplifier means having an output for outputting an amplified HIGH signal in response to the generation of said first signal and for outputting a LOW signal in response to the generation of said second signal;

means responsive to the output of said amplifier means for smoothing said output signal and generating a substantially level DC signal indicative thereof;

comparator means having an input connected to the output of said amplifier means and a comparator output, said comparator means being responsive to said HIGH DC signal for producing a HIGH signal at said comparator output and being further responsive to said LOW DC signal for producing a LOW signal at said comparator output;

a relay coil having an energized and a de-energized state;

switching means having an input connected to said comparator output and further having an output connected to said relay coil, said switching means being responsive to said signal at said comparator output such that when said comparator output is HIGH, said relay coil is in said energized state and when said comparator output is LOW, said relay coil is in said de-energized state; and relay-operated switching means including a Double-Pole Double Throw Switch responsive to said relay coil being in said energized state for maintaining said brake lights off and being further responsive to said relay coil being in said de-energized state for turning on said brake lights even if said manual application of pressure has been removed from said brake pedal as by said driver of said motor vehicle placing his left foot on the clutch and his right foot upon the gasoline control pedal.

14. The combination of claim 13 wherein:

said amplifier means includes an operational amplifier having an inverting input, a non-inverting input, and an operational amplifier output;

a first resistor connected between said operational amplifier output and said inverting input thereof;

a second resistor connected between said inverting input of said amplifier means and ground;

a third resistor connected in series with said inductive coil sensing means between ground and the non-inverting input of said operational amplifier;

a capacitor connected between the positive voltage input of said operational amplifier and the ground output of said operational amplifier;

a comparator means including a second operational amplifier configured as a comparator, said comparator having a positive input, a negative input, and a comparator output;

said amplifier means further including integrator means responsive to the signal at the output of said operational amplifier means for smoothing said signal to produce a substantially DC equivalent thereof, said integrator means including a fourth resistor, a diode, and a fifth resistor, said fourth resistor having one terminal connected to the anode of said diode whose cathode is connected to the first terminal of said fifth resistor and the opposite terminal of said fourth resistor is connected to the output of said operational amplifier while the opposite terminal of said fifth resistor is connected to the positive input of said comparator;

a sixth resistor connected between the junction of the cathode of said diode and said one terminal of said fifth resistor and ground;

a capacitor having one plate connected between the junction of the cathode of said diode and said one terminal of said fifth resistor and ground;

a seventh resistor connected in a feedback path between the output of said comparator and the negative input thereof;

a potentiometer having a first terminal connected to ground and a, second terminal and a potentiometer tap means;

a positive source of potential;

an eighth resistor connected between the negative input of said comparator and potentiometer tap means;

a ninth resistor connected in series with the opposite terminal of said potentiometer means between said positive source of potential and ground, said potentiometer means for manually selecting the delay of the signal at the output of said comparator in cooperation with the RC time constant of said capacitor and said sixth resistor;

said means responsive to the output of said comparator including a transistor having an emitter, a collector, and a base, the emitter of said transistor being connected to ground, the collector of said transistor being connected to the input of said relay coil;

a tenth resistor connected in a series path between the base of said transistor and the comparator output when the signal at the output of said comparator goes HIGH, said transistor is switched to a conductive state for providing a current path between said positive source of potential and ground through the energized relay coil and conducting transistor, and when the signal at the output said comparator goes LOW, said transistor is switched to a non-conductive state for switching said relay coil to said de-energized state.

15. The combination of claim 14 further including a light-emitting diode and an eleventh resistor, said eleventh resistor being connected between said comparator output and the anode of said light-emitting diode whose cathode is connected to ground, said light emitting-diode being energized to emit light whenever the signal at said comparator output is HIGH and being switched off to a non-energized state to emit no light whenever the signal at said comparator output is LOW.

16. The combination of claim 15 further including a second diode having its anode connected to the collector of said transistor and its cathode connected to said positive source of potential.

17. The combination of claim 14 wherein said relay-operated switching means includes:

a first contact terminal P1;
a second contact terminal P4;
a third contact terminal P5;
a fourth contact terminal P8;
a fifth contact terminal P9;
a sixth contact terminal P12;
a seventh contact terminal P13;
a eight contact terminal P14;

one of said left and right brake lights being connected between said first terminal contact P1 and ground;

the other of said left and right brake lights being connected between said second contact terminal P4 and ground;

said third contact terminal P5 being connected to ground;

said fourth contact terminal P8 being connected to said source of battery potential;

said seventh and eight contact terminals P13 and P14, respectively, being connected to said relay coil;

a first switch S1, a second switch S2, and a third switch S3, each of said first, second and third switches S1, S2, and S3, respectively, each being a normally-opened relay-operated switch having a switch arm and a switch contact portion;

said first switch S1 normally having its switch arm in the opened position;

said second switch S2 normally having its switch arm in the opened position;

said third switch S3 normally having its switch arm positioned in the opened position;

a twelve volt source of battery potential;

a voltage input node;

a normally-opened ignition switch having its normally opened contact arm unconnected, said ignition switch being responsive to the turning of the key in said ignition of said motor vehicle for starting and running said motor vehicle engine and for simultaneously switching said ignition switch arm to a closed position to provide a continuous electrical path between said 12 volt source of battery potential and said voltage input node;

said Double-Pole Double-Throw switch being responsive to said relay coil being energized for normally connecting said third contact terminal P5 to said fifth contact terminal P9 and for connecting said fourth contact terminal P8 to said sixth contact terminal P12, which does nothing since said first and second switches S1 and S2 are normally-opened when the relay coil is energized and prevent energy from being applied to said double-pole double-throw switch connected thereto, said double-pole double-throw switch being responsive to said relay coil being switched to a de-energzied state for closing a contact between said first and fifth contact terminals P1 and P9, respectively, and between said second and sixth contact terminals P4 and P12, respectively, while simultaneously closing said first, second and third switches S1, S2, and S3 to provide a continuous electrical path between said 12 volt source of battery potential and ground through a first continuous electrical path comprising said second closed switch S2, said sixth contact terminal P12, said second contact terminal P4, and a first one of said left and right stop lights, and for providing a second continuous electrical path between said 12 volt source of battery potential and ground via said first closed switch S1, said first contact terminal P1, and the other of said left and right brake lights for illuminating said brake lights to indicate that the motor vehicle is stopped even if the brake pedal switch is open indicating that the operator of said motor vehicle has removed his foot from said brake pedal.

18. An auxiliary brake control system for use in a motor vehicle equipped with a standard transmission, a brake pedal, brake lights, a pressure-responsive switch responsive to the application of manually-applied pressure to said brake pedal for actuating said brake lights and responsive to the removal of manually-applied pressure from said brake pedal for deactuating said brake lights, and a shaft whose speed of rotation is substantially proportional to the speed of said motor vehicle, said auxiliary brake light control system comprising:

1st means mounted on said shaft for rotation therewith;
   sensing means for detecting the rotation of said 1st means for generating a first signal in response to the rotational speed thereof being grater than a predetermined value and for generating a second signal in response to the rotational speed thereof being less than said predetermined value;
   2nd means for amplifying at least said first signal and generating an amplified first signal in response thereto;
   3rd means for integrating said amplified first signal for producing a substantially DC value signal equivalent thereto;
   comparator means having a positive input, a negative input and a comparator output;
   4th means for establishing a reference voltage at the negative input of said comparator means;
   5th means for supplying said DC value indicative of said amplified first signal and a DC value indicative of said second signal to the positive input of said comparator;
   said comparator output generating a first signal in response to the DC equivalent of said amplified first comparator output signal at said positive input thereof and for generating a second comparator output signal at the output of said comparator means in response to the DC equivalent of the amplified second signal being supplied thereto;
   a relay coil having an energized state and a de-energized state;
   6th means responsive to said first comparator output signal from the output of said comparator means for normally energizing said relay coil and being further responsive to said second comparator output signal at the output of said comparator means for switching said relay coil to said de-energized state; and
   relay-operated switching means responsive to said relay coil being in said normally energized state for maintaining said brake lights off unless pressure is being manually-applied to said brake pedal, and being responsive to said relay coil being switched to said de-energized state for activating said brake lights even if said manually-applied pressure has been removed from said brake pedal to indicate to following vehicles that the motor vehicle is stopped even though the driver's foot may be removed from the brake pedal.

19. The auxiliary brake light control system of claim 18 wherein said first means includes magnetic means and wherein said sensing means includes an inductive coil responsive to the proximity of said magnetic means for detecting the rotation of said shaft and for generating said first signal in response to the rotational speed thereof being less than or grater than a predetermined value and for generating said second signal in response to the rotational speed thereof being less than said predetermined value and wherein said 2nd means for amplifying at least said first signal includes an operational amplifier;

wherein said 3rd means for integrating includes at least a 1st resistor and a first capacitor for smoothing out the signal at the output of said operational amplifier, and wherein said comparator means includes an operational amplifier configured as a comparator and having a positive input, a negative input and a comparator output, and wherein said auxiliary break light control system further includes a seventh means for providing a time delay to the signal at the output of said comparator, said seventh means including voltage divider means and a second capacitor.

20. An improved brake light control system for a motor vehicle having at least one shaft which rotates at a speed proportional to the actual speed of the motor vehicle, a set of brake lights operably mounted on the rear of the motor vehicle, a brake system, and a brake pedal responsive to the manual application of pressure thereto for operating said brake system, said improved brake light control system comprising, in combination:

(1) a primary brake light control system including a pressure-sensitive switching means connected to said brake pedal and responsive to said manual application of pressure to said brake pedal for activating said set of brake lights and being further responsive to the removal of said manual application of pressure from said brake pedal for deactivating said set of brake lights; and further comprising
   (2) an auxiliary brake light control system including means responsive to the rotation of said at least one shaft for generating a first signal when said shaft is rotating at a speed above a given predetermined speed and for generating a second different and distinct signal when said shaft is at least one of rotating at a speed below said given predetermined speed and stopped; and
   circuit means responsive to the generation of said first signal for maintaining said set of brake lights deactivated and off unless said manual application of pressure has been exterted on said brake pedal, and being further responsive to the generation of said second signal for activating and turning on said set of brake lights even if said manual application of pressure has been removed from said brake pedal.

* * * * *